United States Patent
Flament et al.

(10) Patent No.: US 10,331,948 B1
(45) Date of Patent: Jun. 25, 2019

(54) RULES BASED DATA EXTRACTION

(71) Applicant: EMC Corporation, Hopkinton, MA (US)

(72) Inventors: Arnaud G. Flament, Sunnyvale, CA (US); Guillaume B. Koch, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 14/788,196

(22) Filed: Jun. 30, 2015

Related U.S. Application Data

(60) Provisional application No. 62/158,797, filed on May 8, 2015.

(51) Int. Cl.
| | |
|---|---|
| *G06K 9/20* | (2006.01) |
| *G06K 9/00* | (2006.01) |
| *G06K 9/46* | (2006.01) |
| *G06F 16/22* | (2019.01) |
| *G06F 16/2455* | (2019.01) |

(52) U.S. Cl.
CPC ........ *G06K 9/00463* (2013.01); *G06F 16/22* (2019.01); *G06F 16/24564* (2019.01); *G06K 9/4604* (2013.01)

(58) Field of Classification Search
None
See application file for complete search history.

(56) References Cited

U.S. PATENT DOCUMENTS

| | | | | |
|---|---|---|---|---|
| 6,577,755 | B1* | 6/2003 | Lorie | G06K 9/726 382/140 |
| 2012/0041941 | A1* | 2/2012 | King | G06F 17/218 707/711 |
| 2013/0046823 | A1* | 2/2013 | Mitchell | G06Q 10/107 709/204 |
| 2013/0080369 | A1* | 3/2013 | Zadeh | G06N 7/02 706/48 |
| 2013/0182888 | A1* | 7/2013 | Ovando | B07C 3/12 382/102 |
| 2015/0039474 | A1* | 2/2015 | King | G06K 9/00442 705/26.62 |
| 2015/0127334 | A1* | 5/2015 | Masin | G06Q 10/08 704/231 |

OTHER PUBLICATIONS

CaptureToText, Apr. 18, 2014, http://capture2text.sourceforge.net/, Archived by archive.org.*

* cited by examiner

*Primary Examiner* — Randolph I Chu
(74) *Attorney, Agent, or Firm* — Chamberlain, Hrdlicka, White, Williams & Aughtry

(57) ABSTRACT

A method for rules based data extraction includes extracting content from a document by executing a set of rules on the document. Executing the set of rules comprises for a rule in the set includes obtaining, from a runtime context and based on a rule definition, a input for the rule, executing, using the input for the rule, rule code for the rule to obtain output, where the rule code for the rule is distinct from the rule definition, and storing the output in the runtime context. The method further includes extracting content from the runtime context, and storing the extracted content.

20 Claims, 7 Drawing Sheets

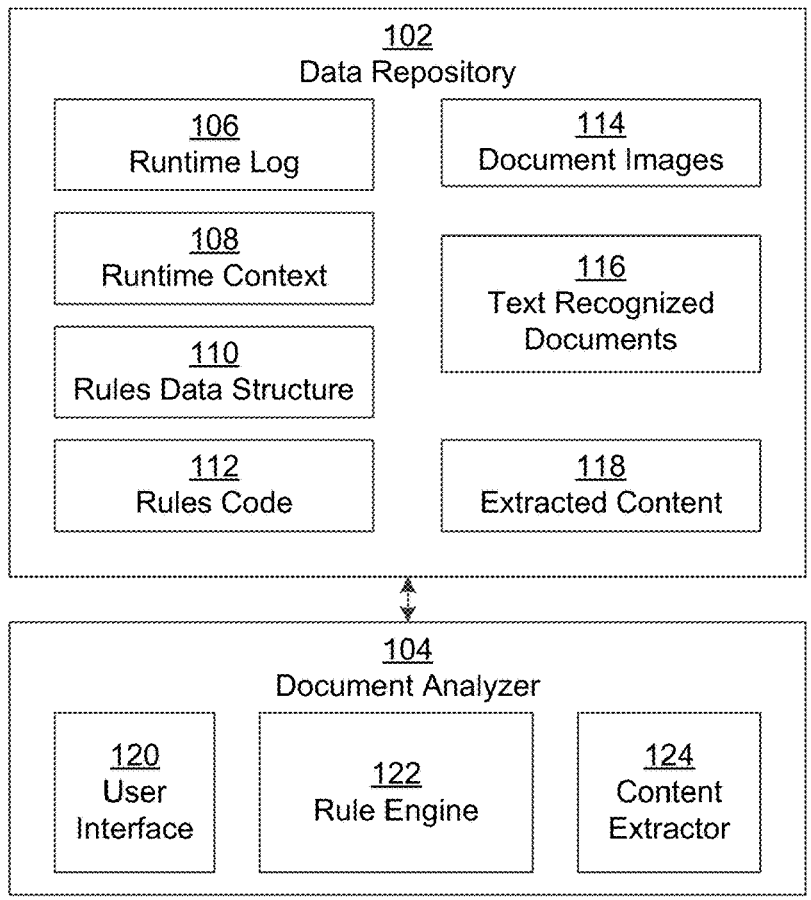
FIG. 1.1
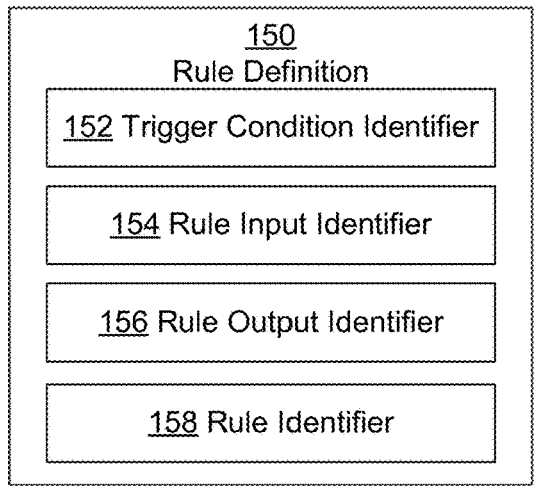
FIG. 1.2

| Rule Id | Name | Value |
|---|---|---|
| 10004 | TargetDataExtractedData 36 | Value: '6953030070'  7.00', Confidence=100, Zones={x=1... |
| 10004 | TargetDataExtractedData 37 | Value: '7.00', Confidence=100, Zones={X=28650,Y=22950,W... |
| 10004 | TargetDataExtractedData 38 | Value: '5 6953030070'  7.00', Confidence=100, Zones={X... |
| 10004 | TargetDataExtractedData 39 | Value: '7.00', Confidence=100, Zones={X=28625,Y=23152,W... |
| 10004 | TargetDataExtractedData 40 | Value: '.00', Confidence=100, Zones={X=9162,Y=23782,Wid... |
| 10004 | TargetDataExtractedData 41 | Value: '6953030400'  4.00', Confidence=100, Zones={x=1... |
| 10004 | TargetDataExtractedData 42 | Value: '12.00', Confidence=100, Zones={X=29408,Y=23800,... |
| 10004 | TargetDataExtractedData 43 | Value: '6953030060'  8.00', Confidence=100, Zones={X=2... |
| 10004 | TargetDataExtractedData 44 | Value: '16.00', Confidence=100, Zones={X=26439,Y=24412,... |

*FIG. 6.1*

Executes rule 10000: 'Freeform_Begin' with Success in 0.01 ms
Executes rule 10002: 'SelectExtraction:InvoiceDate' with Success in 0.05 ms
Executes rule 10007: 'SelectExtraction:DueDate' with Success in 0.05 ms
Executes rule 10003: 'BuildRegularExpressionContentFinder' with Success in 1.53 ms
Executes rule 10008: 'BuildRegularExpressionContentFinder' with Success in 1.10 ms
Executes rule 10004: 'RegExKeywordFinder' with Failure in 0.16 ms
No match
Executes rule 10009: 'RegExKeywordFinder' with Success in 0.21 ms
Executes rule 10005: 'Script_Transform:InvoiceDate' with DependencyFailure in 0.00 ms
Executes rule 10010: 'Script_Transform:DueDate' with Success in 0.12 ms
Executes rule 10006: 'Priority_Filter:InvoiceDate' with DependencyFailure in 0.00 ms
Executes rule 10011: 'Priority_Filter:DueDate' with Success in 0.06 ms
Executes rule 10012: 'OrientationRelation' with DependencyFailure in 0.00 ms
Executes rule 10001: 'BuildResults' with Success in 0.12 ms

*FIG. 6.2*

RULES BASED DATA EXTRACTION

CROSS-REFERENCE TO RELATED APPLICATIONS

This application claims priority under 35 U.S.C. § 119(e) to U.S. Provisional Patent Application Ser. No. 62/158,797, filed on May 8, 2015 and entitled, "Rules Based Data Extraction", which is incorporated herein by reference in its entirety.

BACKGROUND

Optical character recognition (OCR) is the process of identifying text characters from an image. OCR may be performed where the incoming images are scanned images having computer text and/or handwritten text on the images. For example, an individual may handwrite information into a paper form and transmit the paper form to a company for processing. The company may want to extract handwritten information from the form in order to perform additional steps, such as creating an account for the individual, performing application processing, or other actions.

BRIEF DESCRIPTION OF DRAWINGS

FIGS. 1.1, 1.2, and 2 show schematic diagrams in accordance with one or more embodiments of the technology.

FIGS. 5, 6.1, 6.2, and 7 show examples in accordance with one or more embodiments of the technology.

DETAILED DESCRIPTION

Figure 2:
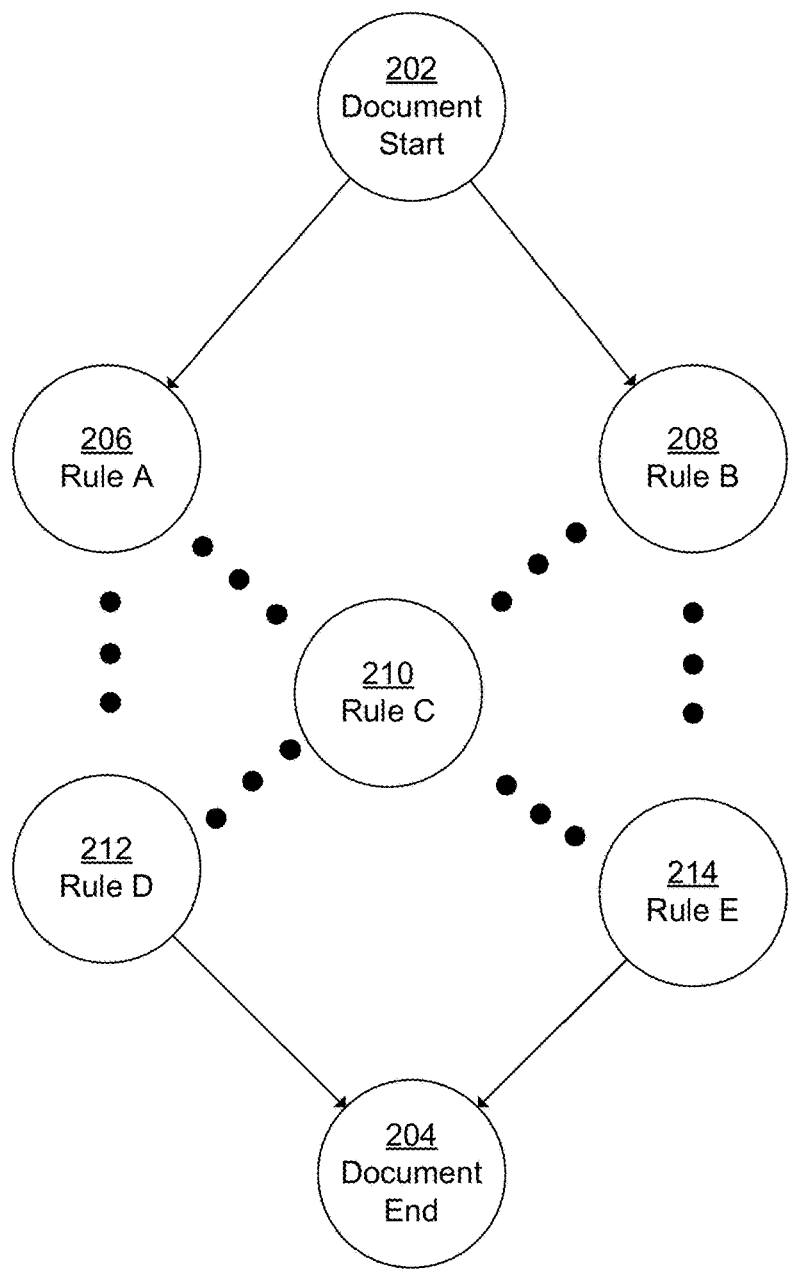

Specific embodiments of the technology will now be described in detail with reference to the accompanying figures. Like elements in the various figures are denoted by like reference numerals for consistency. Further, three collinear dots in the figures mean that additional elements of the same type as the preceding and succeeding element may optionally exist between the collinear dots.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to a rules based data extraction method for extracting data from documents. In particular, the rules and logic are maintained separately from the application that performs the extraction. In one or more embodiments, a partially ordered set (poset) of rules are executed according to the order of the poset to obtain output, which is stored in a runtime context. The content is then extracted from the runtime context and stored.

FIG. 1.1 shows a schematic diagram of a system in accordance with one or more embodiments of the technology. As shown in FIG. 1.1, a data repository (102) is operatively connected in any manner and for any length of time to a document analyzer (104).

In one or more embodiments of the technology, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site. The data repository (102) includes functionality to store a runtime log (106), a runtime context (108), rules code (112), rules data structure (110), document images (114), text recognized documents (116), and extracted content (118). Each of these components is described below.

In one or more embodiments of the technology, the runtime log (106) stores tracking information describing the execution of the rules on a document. In other words, the runtime log (106) is a temporally ordered recording of events that occurred during execution of the rules. More specifically, the log stores a list of recorded events. For example, the recorded events in the runtime log may include a success identifier, data extracted, a time identifier, other information, or a combination thereof. A success identifier may identify whether the rule completed execution successfully or had a failure. If the success identifier indicates failure, the runtime log (106) may include explanation information. The explanation information includes an explanation of how execution of the rule failed. The time identifier may be an identifier of the amount of time to execute the rule. Further, the runtime log may maintain identification of any instructions in the rule code of a rule that takes more than a threshold amount of time to execute.

In one or more embodiments of the technology, the runtime context (108) maintains output from executing the rule in accordance with one or more embodiments of the technology. The output may include a rule identifier, data extracted, the success identifier, and other information from executing the rule. In one or more embodiments of the technology, the output is stored in a searchable format, such as by rule identifier. The data extracted may be an extracted data field identifier and data value pair. The extracted data field identifier may be the same or different than the rule identifier.

In one or more embodiments of the technology, the rules data structure (110) is a data structure for maintaining rule definitions for rules. A rule specifies how to extract data from a document. For example, the rules may include an image routing rule, an extraction rule (e.g., Zonal extraction rule, FullPage extraction rule, scripting processing, sorting processing, data selection, etc.), a zone detection rule to detect a zone or region in the document (e.g., anchor based (textual, graphical), free form based, etc.), or other rule.

A rule definition is a definition of a rule in accordance with one or more embodiments of the technology. For example, FIG. 1.2 shows a rule definition in accordance with one or more embodiments of the technology. As shown in FIG. 1.2, the rule definition (150) includes a trigger condition identifier (152), rule input identifier (154), rule output identifier (156), and rule identifier (158).

The trigger condition identifier (152) is an identifier of a trigger condition. In one or more embodiments of the technology, a trigger condition is a prerequisite that should be satisfied in order to execute the rules. For example, the trigger condition may be one or more rules that should execute prior to the current rule, the success or failure of executing one or more rules, whether a particular data type exists in a runtime context, or a combination thereof. Other trigger conditions may exist without departing from the scope of the technology. In the example, the trigger condition identifier (152) may include an identifier of a preceding rule indicating that the preceding rule executes prior to the current rule. The trigger condition identifier (152) may include an indicator as to whether the preceding rule is to execute successfully or fail in order for the rule defined by the rule definition will execute. The trigger condition identifier (152) may be an extracted data field identifier (discussed below with reference to extracted content) in the runtime context.

The rule input is information that is used by rule code to execute a rule. In other words, the rule input corresponds to one or more input arguments used by rule code referenced by the rule for execution. For example, the rule input identifiers (154) may be identifiers of the extracted data field identifiers to gather from the runtime context, locations in the document (absolute locations or based on anchor data), and any other information used by the rule code to execute the rule. In one or more embodiments of the technology, anchor data is data having a defined value and a defined location in accordance with one or more embodiments of the technology.

The rule output is information returned by the rule code from execution of the rule. In one or more embodiments, a rule output identifier (156) is an identifier of the returned result of the rule. For example, the rule output identifiers may be extracted data field identifier of extracted data from the document output by the rule.

In one or more embodiments of the technology, the rule identifier (158) is a unique identifier of the rule definition (150). For example, the rule identifier may be any alphanumeric, binary, symbolic, or other identifier of a rule. The rule identifier includes a unique identifier of rule code.

In one or more embodiments of the technology, a user desiring to customize the content extractor to extract content from a particular form creates rules by only specifying the trigger conditions, the rule input, the rule output, and rule identifier in a rule definition. The rule code, or instructions that are executed, are predefined when provided to the user. Thus, the system is customizable for many different types of documents.

Returning to FIG. 1.1 and the rules data structure, virtually, any type of data structure may be used in accordance with one or more embodiments of the technology. For example, in one or more embodiments of the technology, rules in the rules data structure is a partially ordered set (poset) (200) separately defined for each document. For example, FIG. 2 shows an example of a graphical representation of the rules. The relationship between the rules, the number of rules, and other aspects of the example may vary without departing from the scope of the technology.

As shown in FIG. 2, the rules may have a document start (202) and a document end (204). The document start (202) specifies a starting position to start executing rules on the document. In some embodiments, the document start (202) may be an initial rule to execute or a standard starting node that leads to an independent set of rules. The document end (204) specifies a completed position to end executing rules on the document. Rather than have an explicit document start and document end node, the document start and document end may be implicit as leading to any starting rule and from ending rule in analyzing the document.

Between the document start (202) and the document end (204) is a directed graph without cycles. In the directed graph, rules are ordered based on the trigger conditions. By way of an example, trigger conditions that may lead to a parent child relationship in the poset may include that a single parent rule must execute prior to the child rule (i.e., the child is dependent on the single parent), at least two parent rules must execute prior to the child rule (i.e., the child is dependent on the at least two parents), at least one of at least two parents must execute prior to the child rule (i.e., the child is dependent on the at least two parents as an alternative), other dependency relationships, or any combination of any of the dependency relationships. Thus, the precedent rules are executed prior to the precedent rule's dependents. Rules that are not dependent on each other may be executed in parallel.

By way of an example, consider the scenario in which the dots in FIG. 2 are arrows leading from the parent to the child nodes. Rule A (206) and Rule B (208) are independent. Rule C (210) requires that either Rule A (206) or Rule B (208) execute successfully. Rule D (212) requires that Rule A (206) and Rule C (210) execute successfully. Rule E (214) requires that Rule B (208) and Rule C (210) execute successfully. In the example, Rule A (206) and Rule B (208) may execute independently and in parallel. Because Rule C (210) is dependent on either Rule A (206) or Rule B (208) executing successfully, when either Rule A (206) or Rule B (208) completes successful execution, then Rule C (210) may start executing. Rule D (212) and Rule E (214) are independent and may execute in parallel, but after Rule C (210) and either Rule A (206) or Rule B (208), respectively. If Rule A (206) and/or Rule B (208) does not execute successfully, then Rule D (212) and/or Rule E (214), respectively, does not execute. In one or more embodiments, if execution proceeds to document end (204), such as through Rule D (212), Rule E (214), or both, then execution may be deemed successful. In other embodiments, if document end (204) is a rule, then execution is successful when the document end (204) rule executes successfully.

The poset shown in FIG. 2 may be a conceptual relationship. In other words, the poset may not exist in any data structure. In other embodiments, the poset may be implemented using pointers from the parent rules to the child rules. In one or more embodiments of the technology, the rules data structure may be maintained in an extensible markup language (XML) format, and/or other markup language format, maintained using any other language.

Returning to the data repository (102) in FIG. 1.1, the rules code (112) is executable software code for each type of rule that implements the instructions to perform for the type of rule. In other words, the rules code is in a programming language that instructs the computing system processor in executing the rule. The rules code may have input arguments and generates output. Each type of rule has a separate rule code for the type of rule. In the rule code for a type of rule, the input arguments are one or more variables with an undefined source location in accordance with one or more embodiments of the technology. Similarly, the output is one or more variables with an undefined target location in accordance with one or more embodiments of the technology. More specifically, a rule definition defines an instance of a type of rule by relating the rule code identifier with the source locations and the target locations, which may be virtual, for a particular rule. Thus, the rule code provides a layer of abstraction for extracting data from a document by allowing the user to only specify inputs and output without having to provide the details to the extraction. Moreover, by including rule code for each type of rule, code reuse is provided by one or more embodiments as multiple instances may use the same rule code.

In one or more embodiments of the technology, the document images (114) are images of documents that have at least some characters as image data. In other words, at least a portion of a document image has information, which is to be extracted in an image format rather than computer encoded text (e.g., ASCII characters, Unicode, or other encoding). In some embodiments, the entire document image (114) is an image. For example, the document images may be computer generated images, pictures of documents, scanned documents, or other images of a document. In one or more embodiments of the technology, the documents may be text based document (e.g., free form invoice, receipt, article, book, or other such document), a form (e.g., an application, tax return, new account form, rebate form, or any other type of form), or any other type of document. Further, the document may have multiple parts, where each part is of a different type. For example, an article may be combined with an application form in a single document.

In one or more embodiments of the technology, text recognized documents (116) are documents in which optical character recognition (OCR) has been performed on the document images (114). Thus, the image data for at least some of the characters is replaced or supplemented in the text recognized document (116) with computer encoded text.

In one or more embodiments of the technology, extracted content (118) is content extracted from the text recognized documents (116). In one or more embodiments of the technology, the extracted content (118) may include the grouping of characters as a string. For example, if a portion of the document is for a first name, letters in the extracted content are grouped as the string of characters having the first name in the text recognized document. More specifically, after OCR is performed, each letter is identified as being in the same position, but the letter may be related to or otherwise encoded with the letter's corresponding ASCII value or other text encoding. Further, the letter may be individual and not as a group of letters. The extracted content (118) may be a grouping of letters that correspond to words or phrases in the original document. The extracted character content may further be stored separate from the document by the grouping, such as in a database record, or other storage.

Turning to the document analyzer (104), the document analyzer (104) corresponds to hardware, software, firmware, or a combination thereof that includes functionality to receive and execute rules. The document analyzer (104) may include rule engine (122) configured to access the rules data structure and execute the rule code according to the rules in the rules data structure. The rules code and/or the rule engine (122) itself may be configured to recognize characters, such as ASCII characters, from an image. In other words, in some embodiments, the rule engine (122) may include an OCR sub-routine (not shown) that only performs OCR processing. In such embodiments of the technology, the OCR sub-routine or OCR engine may be configured to recognize characters before or during execution of the rules. If performed before execution of the rules, the text recognized documents (116) may exist, and the rules code (112) uses the text recognized documents (116). If performed during execution of the rules code, the rules code may include software call to the OCR sub-routine of the rule engine to perform the optical character recognition on the particular portion. If OCR is performed during execution of the rules, the text recognized documents (116) may be omitted as the output is stored directly in the runtime context (108) in accordance with one or more embodiments of the technology. Alternatively, output may be stored in both the runtime context (108) as well as text recognized documents in accordance with one or more embodiments of the technology. In other embodiments, the OCR processing is performed by the rules code.

As discussed above, output for the rules (e.g., extracted characters and label from the document) is stored in a runtime context (108). The content extractor (124) includes functionality to extract the content from the runtime context (108) for storage in a data repository (102). For example, the content extractor (124) may be configured to update or create an account, manage inventory, or perform other actions based on the extracted content.

In one or more embodiments of the technology, the user interface (120) is an interface for receiving rules and providing information about the execution of rules. In particular, the user interface (120) may include graphical user interface components for receiving and displaying the data in the data repository (102) and displaying information about the execution of the rules during runtime.

While FIGS. 1.1, 1.2, and 2 show configurations of components, other configurations may be used without departing from the scope of the technology. For example, various components may be combined to create a single component. As another example, the functionality performed by a single component may be performed by two or more components.

Further, although not shown in FIG. 1.1, in one or more embodiments of the technology, a user may create a document template for each type of document. The document template is the rules data structure defined for the type of document. Thus, the document template may be used to extract content for multiple documents of the same type. For example, consider the scenario in which a financial institution has a new account form that individuals print and send via postal mail. In the example, a representative of the financial institution may create a document template for the new account form. Thus, when new account forms are received via the physical postal mail, the new account forms may be scanned, and the document template with the rules data structure used to execute the rules and extract the content generated. The extracted content may then be stored by the content extractor in a new account for the financial institution's customers.

Figure 3:
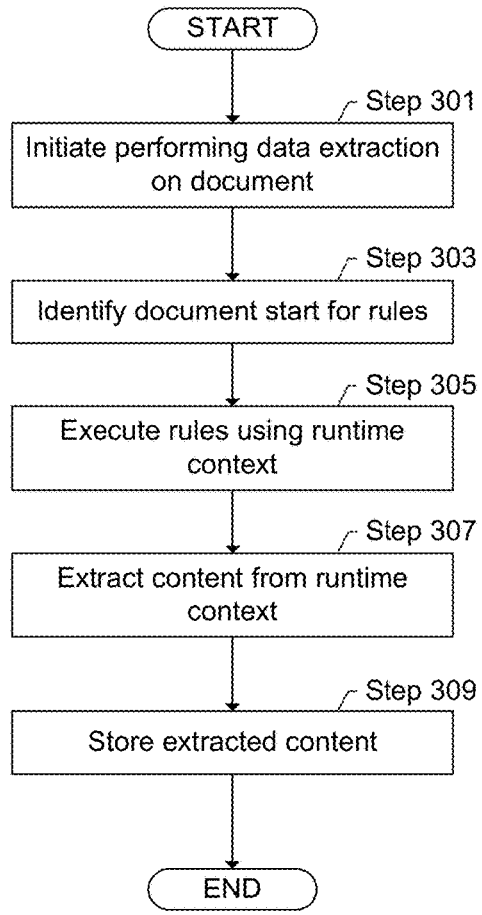
FIGS. 3 and 4 show flowcharts in accordance with one or more embodiments of the technology.
Figure 4:
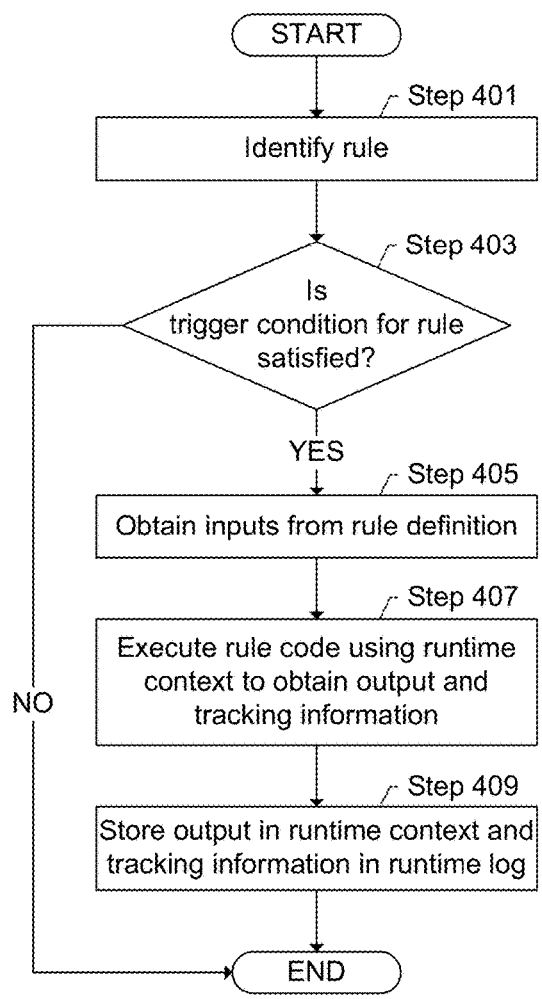

FIGS. 3 and 4 show flowcharts in accordance with one or more embodiments of the technology. In particular, FIG. 3 shows a flowchart for extracting content from a document using the document analyzer in FIG. 1.1. As shown in FIG. 3, one of the steps is to execute rules using the runtime context. FIG. 4 shows a flowchart for executing a rule using a runtime context in accordance with one or more embodiments of the technology. While the various steps in FIGS. 3 and 4 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

Turning to FIG. 3, in Step 301, performing data extraction on a document is initiated in accordance with one or more embodiments of the technology. Initiation of the processing is based on the user having at least one document image from which the user desires to have content extracted. The user may initiate the processing using the user interface of the document analyzer. For example, the user interface may receive an identifier of a file that has or directly or indirectly references the document image(s). In response, the user's input to the user interface triggers execution of the rule engine. In other embodiments, detecting receipt of a document image, such as by a server, may automatically and without human interaction initiate the performing of the data extraction on the received document image. The document image may be created, for example, in at least any of the following manners. For example, a customer of the user may transmit the document to the user, via postal mail and/or via a computer network. If via postal mail, the user may scan the document using a scanner to create a document image. If via a computer network, the customer may take a picture of a tangible copy of the document, scan the filled form, transmit the document via fax machine, or perform another technique to obtain a document image. In some embodiments, the user may receive multiple documents. For example, if the document is a product registration form, the user may receive several thousand filled forms, from all of the user's customers, that the user batch processes. In such a scenario, the Steps of FIG. 3 may be performed for each document, in serial or in parallel.

In Step 303, the document start is identified for the rules in accordance with one or more embodiments of the technology. In one or more embodiments of the technology, the type of document is identified, and based on the type of document, the rules data structure is accessed for the type of document. In other words, a separate rules data structure may exist for each type of document. Thus, the type of document is identified, from input from a human, using code embedded in the document, using another identifier on the document, or based on any other indicia. The corresponding rules data structure for the type of document may be obtained by querying the data repository with the document type identifier. In the corresponding data structure, the document start node is identified and execution of the rules starts with the document start node in accordance with one or more embodiments of the technology.

In Step 305, rules are executed using the runtime context in accordance with one or more embodiments of the technology. In other words, as rules are executed, by executing the corresponding rule code referenced by and using information in the rule definition, content from the document is extracted and stored in the runtime context. The extracted content may be used in execution of other rules in the rules data structure.

FIG. 4 shows a flowchart for executing a rule in accordance with one or more embodiments of the technology. As discussed above, when the precedent rules for a rule have been executed, the rule may be executed by obtaining information from the rules definition. Thus, the Steps of FIG. 4 may be performed in parallel for multiple rules.

In Step 401 of FIG. 4, a rule is identified in accordance with one or more embodiments of the technology. As discussed above, the starting position for executing a rule is the document start in accordance with one or more embodiments of the technology. If the document start is a rule, then the document start is executed. If the document start is not a rule, then the child(ren) rules of the document start rule is/are identified. As execution of a rule completes, either in success or failure, the child(ren) rule(s) of the rule is/are identified and FIG. 4 processing may be initiated on the child(ren) rule(s). Various techniques may be used to search the rules data structure to identify children of the rule and initiate execution. The technique for searching is dependent on the implementation of the rules data structure.

In Step 403, a determination is made whether trigger condition(s) for the rule are satisfied. Determining whether the trigger condition(s) is/are satisfied may be performed by accessing the runtime context. For example, if the trigger condition is the success or failure of another rule, then the runtime context is accessed to determine whether the rule executed successfully or failed. If the trigger condition is that certain data is stored, then the runtime context is accessed to determine whether the data exists in the runtime context. Further, in some embodiments, Steps 401 and 403 correspond to a single step. In other words, the system may continuously search the rules data structure to identify rules whose trigger conditions are satisfied in accordance with one or more embodiments of the technology.

If the trigger condition(s) are not satisfied, then the process may proceed to end in accordance with one or more embodiments of the technology. If the trigger condition(s) are satisfied, the flow may proceed to Step 405.

In Step 405, inputs are obtained from the rule definition in accordance with one or more embodiments of the technology. In other words, as discussed above, the rules definition may store input identifiers, such as extracted data field identifiers to gather from the runtime context, locations in the document (absolute locations or based on anchor data). If the rules definition includes indirect input, such as extracted data field identifiers, then the rule engine may obtain the data referenced by the extracted data field identifiers from the runtime context. Alternatively, the rule engine may transmit the extracted data field identifiers directly as arguments to the rule code. If the rules definition includes direct input, which may be directly used by the rule code, such as locations in the document, then the rule engine may optionally not obtain the data prior to initiating execution of the rule code.

In Step 407, the rule code is executed using the runtime context to obtain output and tracking information in accordance with one or more embodiments of the technology. In other words, the rule engine issues a call with input arguments to the rule code identified by the rules code identifier. The input arguments include the inputs obtained in Step 405. During execution of the rule code, the rule code may be instrumented with tracing code to track execution of the rules. Thus, the rules code may automatically store information into the tracking log. Alternatively or additionally, the rule engine may initiate a timer before issuing the call to track the length of time for execution. Executing the rule code may include comparing content extracted from the document, such as by different rules, extracting content from a document, or performing other such actions. For example, input to the rule code may include an identifier of an anchor position in the document and the position of data to extract relative to the anchor position. In such a scenario, the rule code identifies the anchor position in the document, and extracts the content accordingly. The rule code may further perform corrective processing to correct any characters misidentified in the OCR process, such as by using a spelling program or other corrective action. Thus, for example, if the extracted data is known to include only letters and a number is present, the corrective action may replace the number with the corresponding letter (e.g., number 1 may be replaced with lowercase l and number 0 may be replaced with uppercase O). By way of another example, the rule code may perform a comparison of output from two rules and select the output that the rule code determines is correct. For example, a customer account number may appear in multiple places on a form. In such a scenario, different rule code may be executed to extract the customer account number from the multiple places. Another rule code may be executed to compare the extracted customer account number and determine whether the customer's account number matches. The execution of the rule code may result in success (e.g., information extracted or compared with successful results) or failure (e.g., information not present, comparison failed, data was too blurred in the document image to identify characters, etc.).

In Step 409, the output is stored in the runtime context and the tracking information is stored in the runtime log in accordance with one or more embodiments of the technology. In one or more embodiments of the technology, the output and tracking information may be stored by the rule engine and/or the rule code.

Returning to FIG. 3, in Step 307, content is extracted from the runtime context in accordance with one or more embodiments of the technology. In one or more embodiments of the technology, after or during processing the content extractor obtains data from the runtime context. Further, in Step 309, the extracted content is stored in accordance with one or more embodiments of the technology. For example, a record may be created or updated with the extracted content. Other techniques for storing the extracted content may be used without departing from the scope of the technology.

The following is an example rule definition in accordance with one or more embodiments of the technology. In particular, Rule 1 causes a default value to be used if the results of executing neither buildExtractedData1 and buildExtractedData2 succeed.

defaultValue.Trigger.With(buildExtractedData1,build-
        ExtractedData2). None( ).Succeed( );        (Rule 1)

The following Rule 2 causes a default value to be used if the results of executing both buildExtractedData1 and buildExtractedData2 fail.

defaultValue.Trigger.With(buildExtractedData1,build-
        ExtractedData2). All( ).Failed( );        (Rule 2)

Figure 5:
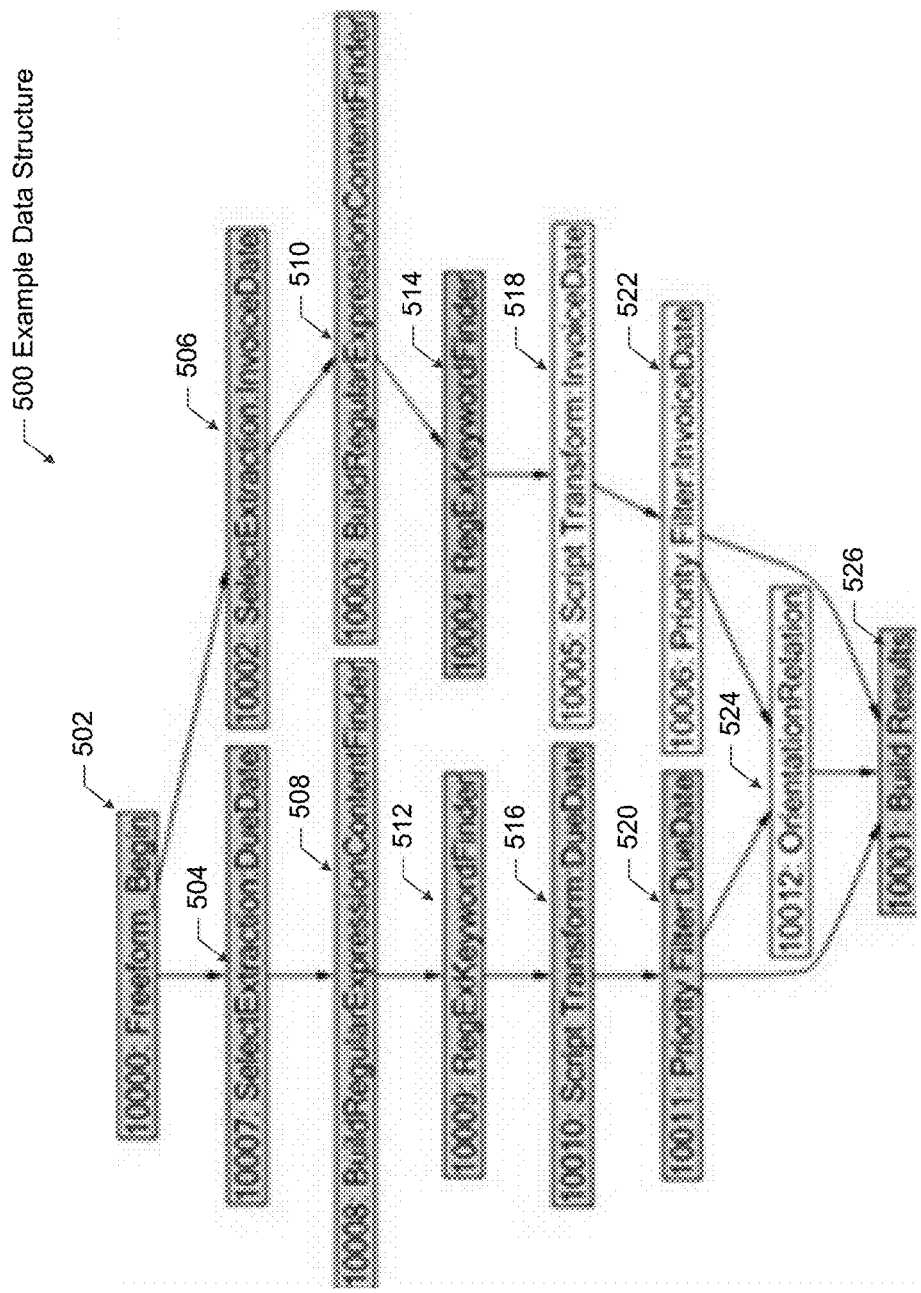
Figure 7:
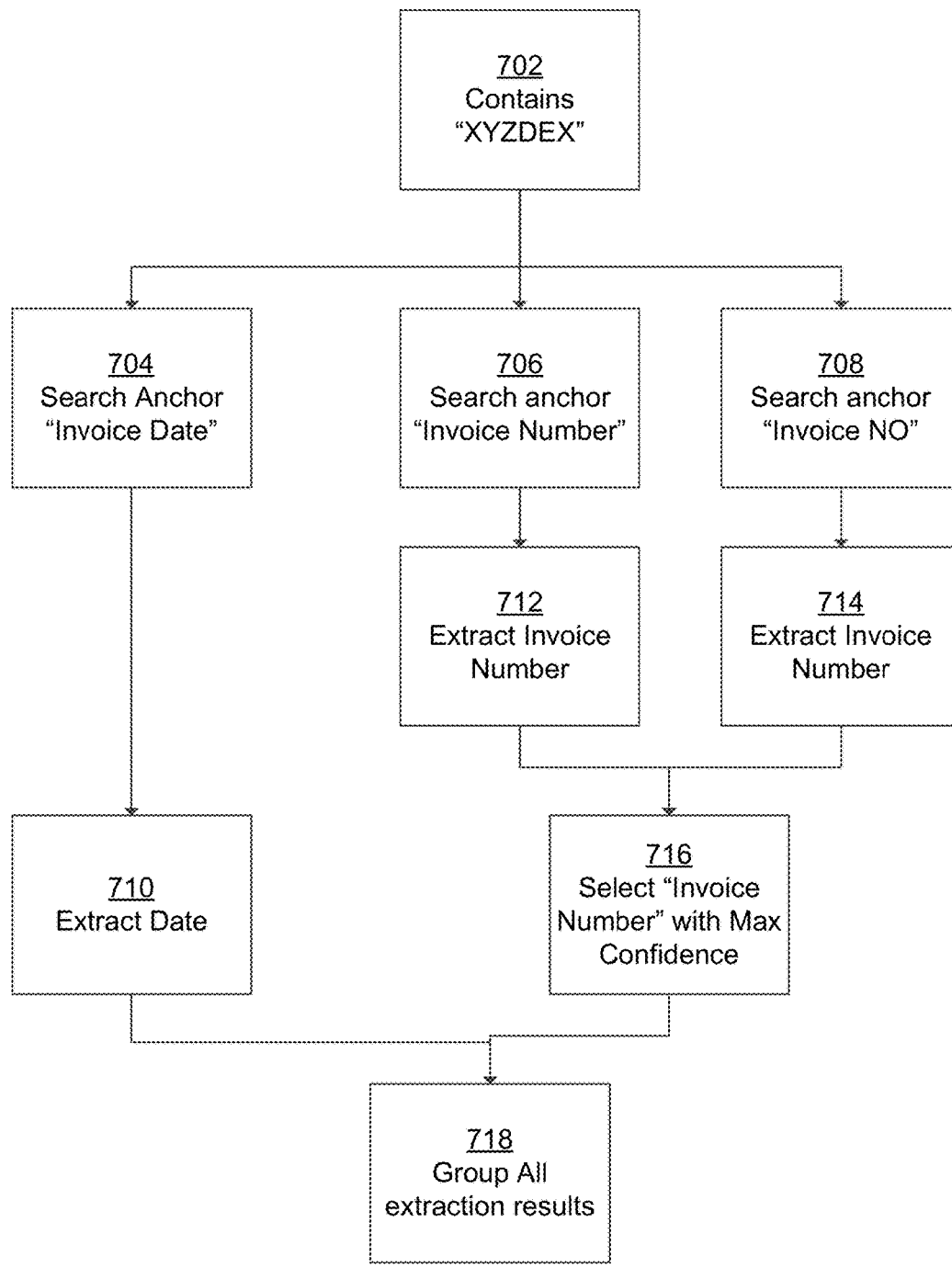

FIGS. 5, 6.1, 6.2, and 7 show examples in accordance with one or more embodiments of the technology. In particular, FIG. 5 shows an example of a poset of rule definitions in accordance with one or more embodiments of the technology. FIGS. 6.1 and 6.2 show an example log in accordance with one or more embodiments of the technology. FIG. 7 shows another example of a rules data structure in accordance with one or more embodiments of the technology. FIGS. 5, 6.1, 6.2, and 7 may be performed using the system and methods discussed above with reference to FIGS. 1.1, 1.2, 2, 3, and 4.

In FIG. 5, each rule definition is a separate node. For the purposes of clarify in the example, the rule definition may not be a complete definition, but only a portion of the rule definition. The number before each rule in each node may be a rule identifier. Turning to FIG. 5, Rule 10000 (502) is a document start node. Rule 10007 (504) is to extract the due date. Rule 10002 (506) is to extract the invoice date. As shown in FIG. 5, rule 10007 (504) and rule 10002 (506) are instances of the same rule code that operates on different inputs and are independent. Rule 10008 (508) and rule 10003 (510) execute instances of the same rule code to builds a regular expression content finder from the extracted data obtained in rule 10007 (504) and rule 10002 (506), respectively. Rule 10009 (512) and rule 10004 (514) execute instances of the same rule code to builds a regular expression keyword finder from the extracted data obtained in rule 10008 (508) and rule 10003 (510), respectively. Rule 10010 (516) and rule 10005 (518) execute instances of the same rule code to transform the processed data generated by rule 10009 (512) and rule 10004 (514), respectively. Rule 10011 (520) and rule 10006 (522) execute instances of the same rule code to filter the processed data generated by rule 10010 (516) and rule 10005 (518), respectively. Rule 10012 (524) manages the orientation relation between the due date and the invoice date. Rule 10001 (526) is the document end to extract content from the runtime context.

FIGS. 6.1 and 6.2 show output from executing the rules in FIG. 5. For example, FIG. 6.1 shows an example portion of a runtime context generated by executing rule 10004 (514) in FIG. 5. As shown in FIG. 6.1, the runtime context may include the rule identifier, the name of the data extracted, the value extracted, a confidence level in the extracted value, and a zone identifier in the document in which the extracted value is identified. FIG. 6.2 shows an example of a runtime log that may be generated using the rule data structure in FIG. 5. The log shown in FIG. 6.2 may replace or be generated in addition to the runtime context shown in FIG. 6.1. In FIG. 6.2, as each rule is executed, the execution log maintains the rule identifier, a name of the rule, whether success or failure occurred, and amount of time to success or failure.

FIG. 7 shows another example of a rules data structure for extracting an invoice number and an invoice date from a particular invoice. In the example shown in FIG. 7, consider the scenario in which the invoice number is present in at least two parts of the invoice. In node 702, the document start is a rule that verifies the identifier of the invoice is "XYZDEX". Node 704, node 706, and node 708 are independent of each other and may be performed in parallel. Node 704 is for a rule to find the location of an anchor having the words "Invoice Date." In other words, the input for the rule in node 704 is "Invoice Date." Similarly, node 706 and node 708 are for rules to find the location of an anchor having the words "Invoice Number" and "Invoice No.", respectively. Node 710 is to extract the date based on the anchor found in node 704. Similarly, node 712 and node 714 is for rules to extract the invoice number from the position returned in node 706 and 708, respectively. Because the result is two invoice numbers, which may or may not match, node 716 is to select the invoice number having the highest confidence score. The confidence score is automatically calculated during execution of node 712 and node 714, and may be based, for example, on the amount of blur, or character confidence provided by the OCR engine, in the document image at the positions of the invoice numbers. Node 718 is dependent on node 710 and node 716. Node 718 is to group the result of the invoice date and the selected invoice number. As shown in the example, by separating the rule definition from the rule code from the rule engine, one or more embodiments provide a technique for simplifying the extraction of data from a document. In other words, by only creating a rules definition, the user may easily define how to extract the data from the document.

By using rules, one or more embodiments may be capable of extracting data from different sections of images and comparing such data during extraction. For example, a first rule may specify a first position of the data based on a first anchor for the data. A second rule may specify a second position of the data based on a second anchor point. A user may, for example, setup the rules definitions such that the execution of the first rule or second rule may be dependent on the other rule failing (e.g., the characters are not clear enough for the rule engine to recognize the characters). By way of another example, the user may setup the rules engine such that the first rule and second rule execute in parallel and the resulting recognized characters are compared at the end. As shown in the example, the rules engine provides a technique for having user specified complex rules for extracting content from a document.

Figure 8:
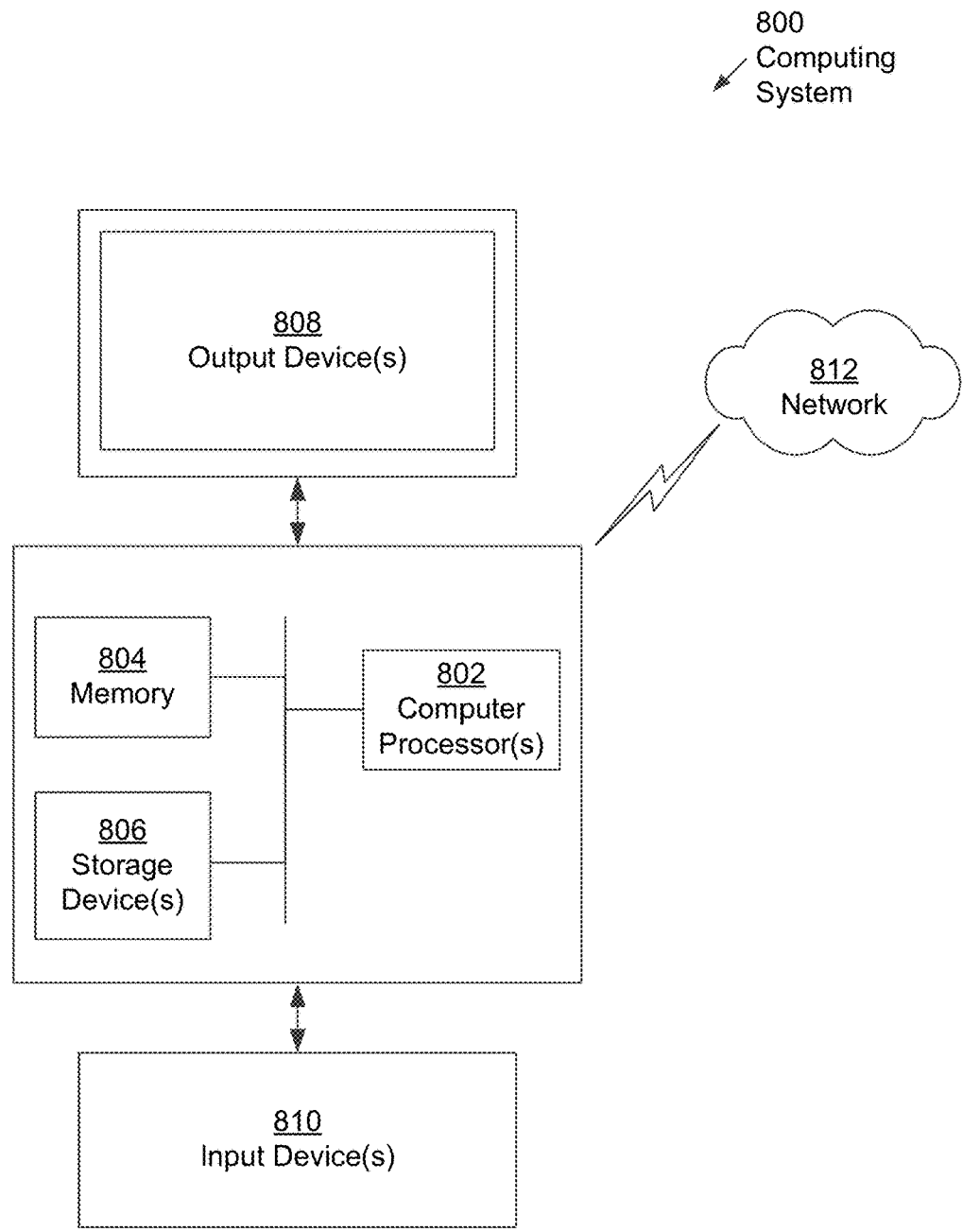
FIG. 8 shows a computing system in accordance with one or more embodiments of the technology.

Embodiments of the technology may be implemented on a computing system. Any combination of mobile, desktop, server, embedded, or other types of hardware may be used. For example, FIG. 8 shows a computing system. The computing system may include functionality to execute one or more components of the system shown in FIG. 1.1. As shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for rules based data extraction comprising:
    extracting content from a document by executing a set of rules on the document, wherein executing the set of rules for a first rule in the set comprises:
        obtaining, from a runtime context and based on a first rule definition stored separately from the runtime context, a first input for the first rule,
        executing, using the first input for the first rule, rule code for the first rule to obtain first output, wherein the rule code for the first rule is distinct from the first rule definition and the rule code for the first rule is stored separately from the runtime context,
        storing the first output in the runtime context, and
        formatting the first output in a searchable format that enables the first output to be identified based on a search for output generated using the first rule;
    extracting content from the runtime context after extracting content from the document; and
    storing the extracted content from the runtime context,
    wherein the first output is formatted before any other rule of the set of rules is executed.

2. The method of claim 1, wherein the formatted first output comprises a rule identifier of the first rule, the first output, and a success identifier.

3. The method of claim 1, wherein executing the set of rules further comprises for the first rule in the set:
    identifying a triggering condition from the first rule,
    determining that the triggering condition is satisfied using the runtime context,
    wherein the rule code is executed in response to determining that the triggering condition is satisfied.

4. The method of claim 3, wherein executing the set of rules further comprises:
    identifying a second triggering condition from a second rule, wherein the second triggering condition is application of the first rule;
    making a determination that the second triggering condition is satisfied by, in part, performing a search for output generated by the first rule, and
    in response to the determination:
        executing, using the first out, second rule code for the second rule to obtain second output.

5. The method of claim 1, wherein the first output comprises a successful status indicator and a first content from the document.

6. The method of claim 5, wherein executing the set of rules for a second rule in the set comprises:
   determining, based on a triggering condition in a second rule definition stored separately from the runtime context, and from the first output in the runtime context, that execution of the first rule is successful,
   obtaining, from the runtime context and in response to determining that execution of the first rule is successful, the first content as a second input for the second rule from the runtime context,
   executing, using the second input, rule code for the second rule stored separately from the runtime context to obtain second output, and
   storing the second output in the runtime context.

7. The method of claim 1, wherein the first output comprises a failed status indicator, and wherein executing the set of rules for a second rule in the set comprises:
   determining, based on a triggering condition in a second rule definition stored separately from the runtime context, and from the first output in the runtime context, that execution of the first rule is failed,
   obtaining, from the runtime context and in response to determining that execution of the first rule failed, a second input for the second rule from the runtime context,
   executing, using the second input, rule code for the second rule stored separately from the runtime context to obtain second output, and
   storing the second output in the runtime context.

8. A system for rules based data extraction comprising:
   a non-transitory data repository that stores rule code and a runtime context;
   a content extractor that:
      extracts content from a document by executing a set of rules on the document, wherein executing the set of rules for a first rule in the set comprises:
         obtaining, from a runtime context and based on a first rule definition stored separately from the runtime context, a first input for the first rule,
         executing, using the first input for the first rule, rule code for the first rule to obtain first output, wherein the rule code for the first rule is distinct from the first rule definition and the rule code for the first rule is stored separately from the runtime context,
         storing the first output in the runtime context, and
         formatting the first output in a searchable format that enables the first output to be identified based on a search for output generated using the first rule;
      extracts content from the runtime context after extracting content from the document; and
      stores the extracted content from the runtime context, wherein the first output is formatted before any other rule of the set of rules is executed.

9. The system of claim 8, wherein the formatted first output comprises a rule identifier of the first rule, the first output, and a success identifier.

10. The system of claim 8, wherein executing the set of rules further comprises for the first rule in the set:
   identifying a triggering condition from the first rule,
   determining that the triggering condition is satisfied using the runtime context,
   wherein the rule code is executed in response to determining that the triggering condition is satisfied.

11. The system of claim 10, wherein executing the set of rules further comprises:
   identifying a second triggering condition from a second rule, wherein the second triggering condition is application of the first rule;
   making a determination that the second triggering condition is satisfied by, in part, performing a search for output generated by the first rule, and
   in response to the determination:
      executing, using the first out, second rule code for the second rule to obtain second output.

12. The system of claim 8, wherein the first output comprises a successful status indicator and a first content from the document.

13. The system of claim 12, wherein executing the set of rules for a second rule in the set comprises:
   determining, based on a triggering condition in a second rule definition stored separately from the runtime context, and from the first output in the runtime context, that execution of the first rule is successful,
   obtaining, from the runtime context and in response to determining that execution of the first rule is successful, the first content as a second input for the second rule from the runtime context,
   executing, using the second input, rule code for the second rule stored separately from the runtime context to obtain second output, and
   storing the second output in the runtime context.

14. The system of claim 8, wherein the first output comprises a failed status indicator, and wherein executing the set of rules for a second rule in the set comprises:
   determining, based on a triggering condition in a second rule definition stored separately from the runtime context, and from the first output in the runtime context, that execution of the first rule is failed,
   obtaining, from the runtime context and in response to determining that execution of the first rule failed, a second input for the second rule from the runtime context,
   executing, using the second input, rule code for the second rule stored separately from the runtime context to obtain second output, and
   storing the second output in the runtime context.

15. A non-transitory computer readable medium for rules based data extraction comprising computer readable program code for:
   extracting content from a document by executing a set of rules on the document, wherein executing the set of rules for a first rule in the set comprises:
      obtaining, from a runtime context and based on a first rule definition stored separately from the runtime context, a first input for the first rule,
      executing, using the first input for the first rule, rule code for the first rule to obtain first output, wherein the rule code for the first rule is distinct from the first rule definition and the rule code for the first rule is stored separately from the runtime context,
      storing the first output in the runtime context, and
      formatting the first output in a searchable format that enables the first output to be identified based on a search for output generated using the first rule;
   extracting content from the runtime context after extracting content from the document; and
   storing the extracted content from the runtime context, wherein the first output is formatted before any other rule of the set of rules is executed.

16. The non-transitory computer readable medium of claim 15, wherein the formatted first output comprises a rule identifier of the first rule, the first output, and a success identifier.

17. The non-transitory computer readable medium of claim 15, wherein executing the set of rules further comprises for the first rule in the set:
identifying a triggering condition from the first rule,
determining that the triggering condition is satisfied using the runtime context,
wherein the rule code is executed in response to determining that the triggering condition is satisfied.

18. The non-transitory computer readable medium of claim 17, wherein executing the set of rules further comprises:
identifying a second triggering condition from a second rule, wherein the second triggering condition is application of the first rule;
making a determination that the second triggering condition is satisfied by, in part, performing a search for output generated by the first rule, and
in response to the determination:
executing, using the first out, second rule code for the second rule to obtain second output.

19. The non-transitory computer readable medium of claim 15, wherein the first output comprises a successful status indicator and a first content from the document, and wherein executing the set of rules for a second rule in the set comprises:
determining, based on a triggering condition in a second rule definition stored separately from the runtime context, and from the first output in the runtime context, that execution of the first rule is successful,
obtaining, from the runtime context and in response to determining that execution of the first rule is successful, the first content as a second input for the second rule from the runtime context,
executing, using the second input, rule code for the second rule stored separately from the runtime context to obtain second output, and
storing the second output in the runtime context.

20. The non-transitory computer readable medium of claim 15, wherein the first output comprises a failed status indicator, and wherein executing the set of rules for a second rule in the set comprises:
determining, based on a triggering condition in a second rule definition stored separately from the runtime context, and from the first output in the runtime context, that execution of the first rule is failed,
obtaining, from the runtime context and in response to determining that execution of the first rule failed, a second input for the second rule from the runtime context,
executing, using the second input, rule code for the second rule stored separately from the runtime context to obtain second output, and
storing the second output in the runtime context.

* * * * *